Oct. 6, 1942.  A. M. SHOEMAKER  2,297,844
OPTICAL DEVICE
Filed Jan. 17, 1941   2 Sheets-Sheet 2
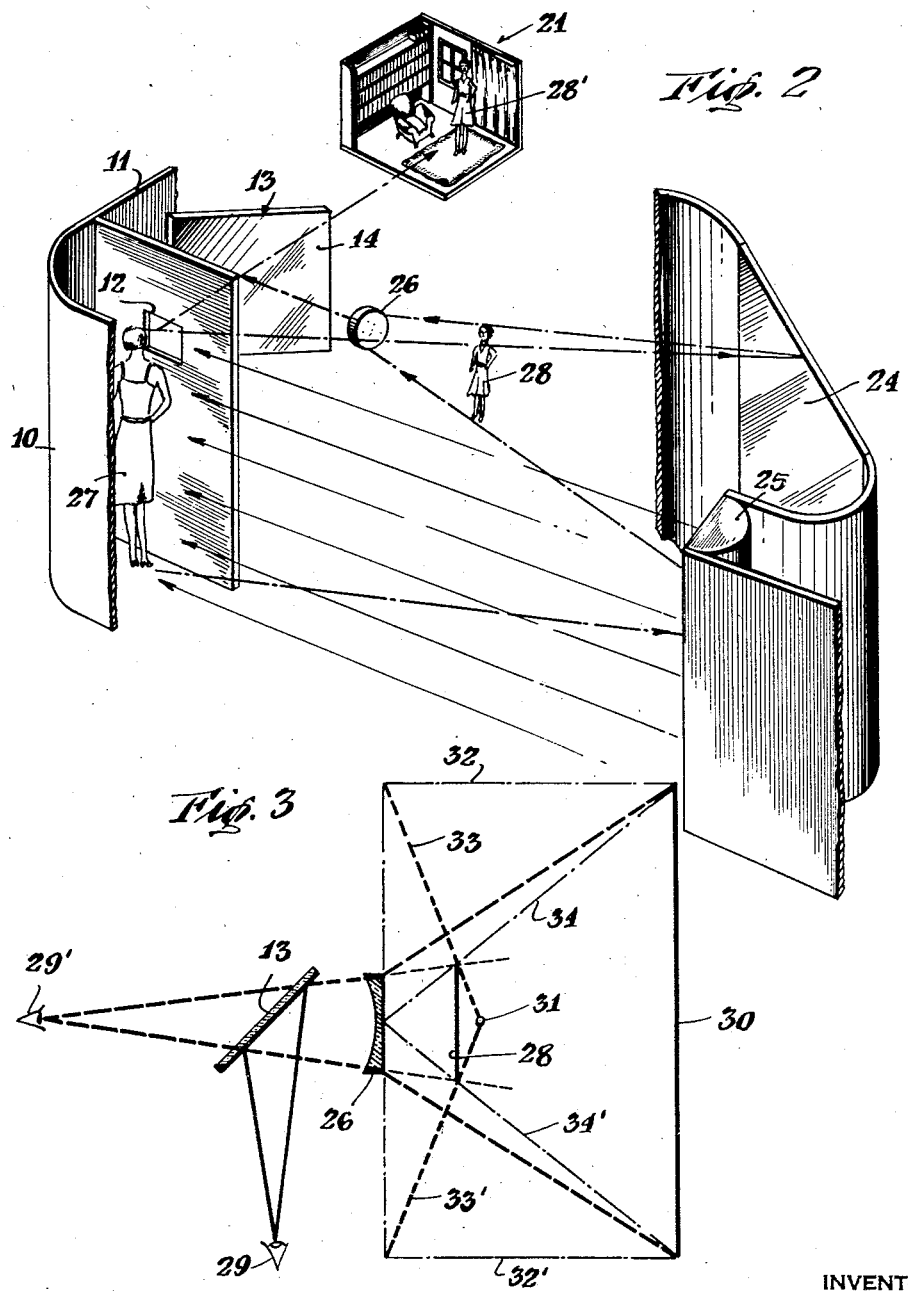
INVENTOR
Albert M. Shoemaker
BY
ATTORNEYS Patented Oct. 6, 1942

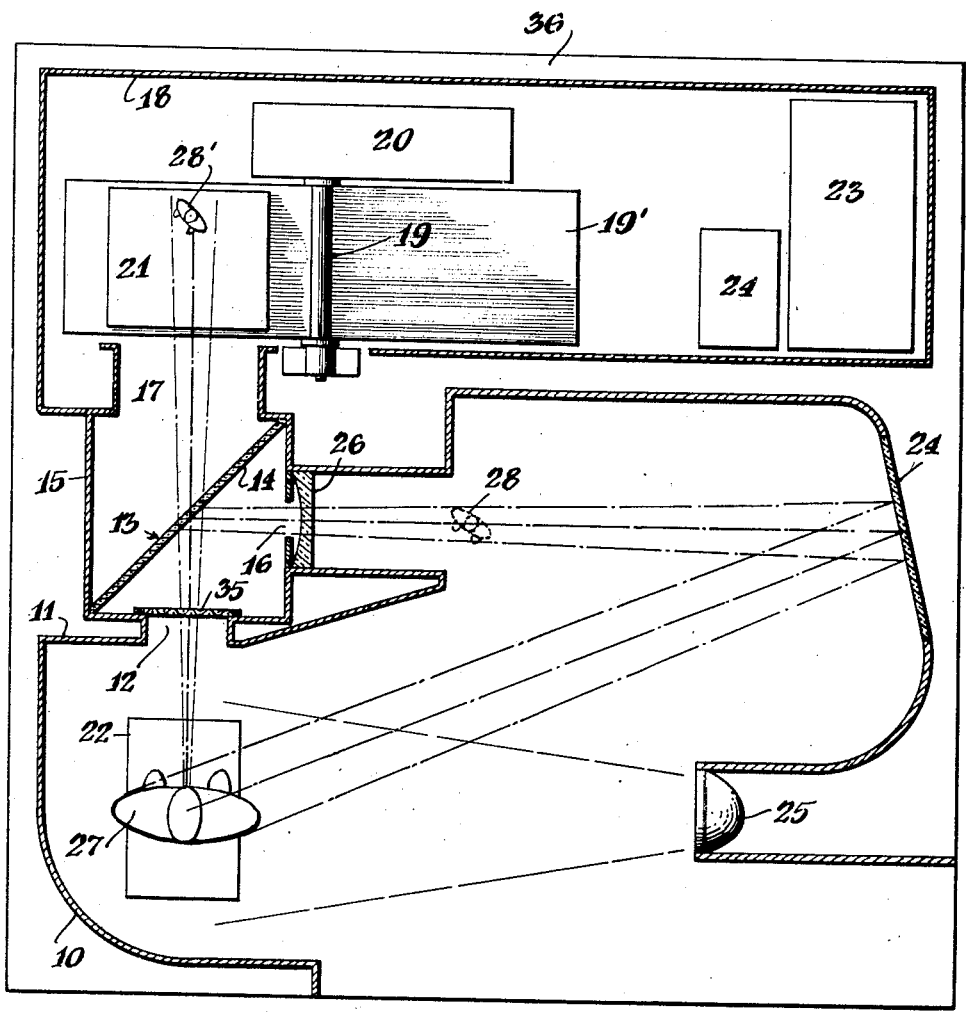

2,297,844

UNITED STATES PATENT OFFICE 2,297,844

OPTICAL DEVICE

Albert M. Shoemaker, New York, N. Y., assignor to Diorama Corporation of America, Queens County, N. Y., a corporation of New York Application January 17, 1941, Serial No. 374,878

3 Claims. (Cl. 88—24)

This invention relates to an optical system for creating in changed size the images of objects or persons and utilizing said changed image sizes as part of a composite scene, set, or display.

One of the objects of this invention is to enable an observer to see himself in a miniature set and reduced in size proportionate to this set.

A further object is to provide an apparatus, whereby the observer can go through ordinary motions and movements and see himself assuming these motions and movements in reduced size as part of a miniature set.

A still further object is to provide an apparatus whereby audiences can directly, or by means of television transmittal or motion picture projection, view miniature sets, stages and scenes and whereby the actors may appear on this miniature set in size proportionate thereto. By this means, the television audience can be made to receive the picture as though the entire set were full scale size.

In one aspect, the invention has particular application for display of miniature model rooms complete with rugs, furniture, curtains, wall paper, and other decorative features. Such miniatures have proven very popular in stores which do not have the floor space necessary to erect full-scale model rooms. In the use of such miniature sets, one difficulty has been that the shopper has not been able to translate the small scale of the miniature into a true mental picture of a full-sized room.

By means of the present invention, the shopper observes the miniature room and finds himself, by means of an optical illusion, standing in the room in reduced size proportionate to the room. Additionally, the observer or shopper may, by making the necessary motions, find himself walking in such room or about to be seated in a chair in such room. This enables the observer or shopper to visualize precisely the appearances of a room similar to the miniature room, but in full size.

These and many other objects are successfully achieved by utilization of the invention now to be described and illustrated in the following drawings in which:

Fig. 1 shows a plan view of the apparatus;

Fig. 2 is a perspective simplified view showing the observer in full size and also in reduced size in a miniature set;

Fig. 3 is a diagrammatic representation of a portion of the mechanism showing the manner in which the image is formed.

The drawings disclose in many respects a simplified mechanism for achieving the main objects of this invention. It is, of course, to be understood that numerous refinements of parts are possible without in any manner departing from the major outlines herein.

Referring now to Figs. 1 and 2, there is provided a shell 10 which forms a light absorbent background for the observer, which observer in the illustration shown is also part of the object to be viewed. Directly in front of the observer is a light shielding partition 11 which has an opening 12 therein sufficiently large to enable the observer to look therethrough. Directly in front of this opening and placed at an angle of approximately 45° to the line of vision of the observer is a transparent mirror 13. In its preferred form, this mirror has an aluminum or other reflective surface 14 facing towards the observer and is so constructed that it is capable of reflecting light as a true mirror and of transmitting light so that objects behind it may be visible. As shown in Fig. 1 this mirror may be positioned in transparent mirror box 15 which has in addition to an opening in registry with opening 12, a further opening 16 positioned in the side wall to the right of the wall having opening 12. The rear wall of box 15 has opening 17, which permits a mechanism mounted behind it to be viewed. Behind this opening, any desired miniature set, for example, a living room such as shown in Fig. 2 may be positioned. If desired, numerous miniature sets may be mounted on a revolving drum 19' and mechanism furnished whereby the revolving drum can be changed at will to bring into registry with opening 17 different display sets.

As shown in Fig. 1, a housing 18 is provided for enclosing and to serve as a mounting for this revolving drum mechanism. Drum 19' is mounted on shaft 19 which is in turn mounted in said housing and driven by any means, for example, a motor conventionally illustrated at 20. One of the sets mounted on this revolving drum is shown at 21 in registry with the opening 17 so that the observer may look through opening 12, the transparent mirror 13, and opening 17 and view this set.

It is of course, necessary to effectively light the set to have it clearly visible through the transparent mirror. This can be done by any of numerous ways. However, as illustrated in Fig. 1, a treadle platform 22 may be provided whereby as the observer stands on the platform, a switch contact is made and the set 21 lighted. It is, of course, also feasible to attach to the same switching mechanism, means for starting a movement of the revolving drum and also placing in action, a sound mechanism which has conventionally been shown at 23 and 24. This sound mechanism can, of course, be maintained to supplement, by descriptive matter, the displays as shown and by this means, the device may prove especially effective for advertising purposes.

I have thus far explained solely the mechanism whereby the observer may view the miniature set. I will now set forth the manner in which the observer himself is projected into the set and reduced to the proportionate size of the set.

To achieve this, a full sized full silvered mirror 24 is placed to one side and some distance from the observer. In order to sufficiently light the observer, it has been found desirable to place a main source of light comprising a large full length battery of lights 25 in conjunction with and just in advance of the mirror. Secondary overhead spot lights are also desirable. The angle at which mirror 24 is placed is determined by the location of opening 16 for it is the aim of this mechanism to have the light rays pass through opening 16, reflect on the transparent mirror 13, and be picked up again by the observer. Placed adjacent opening 16 and between it and mirror 24 is a concave reducing lens or lenses 26. In its broad aspect, this lens serves the purpose of reducing the full sized image which is reflected in mirror 24 to a size in proportion to the miniature set 21.

In order to give the desired effect, it is necessary to have the image in its reduced form appear the same distance away from transparent mirror 13 as is the set 21. Of course, it is to be understood that in the placement of all of the parts, tolerances are permitted whereby movements both of the observer and changes in the depth of the set are such that at all times the observer may, within certain limits, remain in the set he is observing.

In order to more fully explain the specific lens reducing structure and the location of the image, we refer now to Figs. 1 and 3. In Fig. 1 it will be observed that the observer is represented in conventional form at 27. Light rays from the observer travel to mirror 24 and are reflected through condensing lens 26 and the image appears at 28. This image is the image which the observer 27 now sees reflected in mirror 13 from the first surface 14. Since the distance of 28 from mirror 13 is approximately the same as the distance of set 21 from mirror 13, the observer has the impression that image 28 is in position 28' and thus the observer sees himself within the set and in reduced size.

In Fig. 3 the eye of the observer is indicated diagrammatically at 29' which is the point at which observers' eye 29 would be, were it not for the change of direction of the line of vision created by the transparent mirror 13. In considering this figure we can, however, discuss it as if the eye were at 29'. The object is shown at 30 and may be assumed to be the full sized image picked up by mirror 24. In the specific case shown in Fig. 2 the object is the full sized reflection of the observer. The lens 26 is indicated as having a focal point 31 positioned between the object and the lens. Assuming a simple lens with a minimum of aberration, we can construct with some accuracy, the position of the image. This is shown by construction lines 32 and 32' which are drawn parallel to the axis which passes through the focal point. From the point at which these lines intersect the lens, lines 33 and 33' are drawn to the focal point 31 then from each end of the object construction lines 34 and 34' are drawn to the approximate center of the lens. The intersection of the lines 33 and 34 gives the top point of the object and the intersection of lines 33' and 34', the bottom of the object.

It will be observed that the image is considerably reduced in size and is additionally an erect image in the same upright position as that of the object. This construction shows rather clearly how image 28 is located and shows also how the reduction in size is determined.

When the apparatus is used as a display mechanism for displaying furniture, rugs, draperies, etc., and is used in connection with a revolving drum, it has been found desirable to have a shutter mechanism operate automatically between changes of sets. For this purpose, a curtain 35 may be inserted to obstruct opening 12 and to operate automatically in relation to the movement of the drum.

As shown, the entire mechanism including the shell 10, box 15, and housing 18 and the mirror and light mechanism 25 may be mounted upon a single platform 36. Such construction is, of course, desirable to enable the parts to be secured in place according to the pre-arranged distances. To carry out this purpose, the base 36 may have permanent fastening devices capable of receiving the various parts to be mounted thereon.

Within the foregoing and the appended claims, numerous rearrangements of parts and changes in construction may be resorted to without departing in any manner from the spirit of this invention.

I claim:

1. A display device including in combination, a housing formed with a viewing aperture, a miniature group positioned within said housing and in line with said aperture, a condenser lens assembly also located within said housing, reflecting means positioned to one side of said housing and designed to transmit the image of the observer to said condenser lens assembly, and a transparent mirror positioned between said miniature group and said viewing aperture and in the focal plane of said condenser lens assembly, whereby the observer sees a composite illusion of himself in miniature as a part of said miniature group.

2. A display device including in combination, a housing formed with a viewing aperture, a miniature group positioned within said housing and in line with said aperture, a condenser lens assembly also located within said housing, reflecting means positioned to one side of said housing and designed to transmit the image of the observer to said condenser lens assembly, and a transparent mirror positioned between said miniature group and said viewing aperture and in the focal plane of said condenser lens assembly, whereby the observer views a reflection of himself in miniature as projected by said condenser lens assembly upon said transparent mirror and also views said miniature group through said mirror, thus creating an illusion of the observer in miniature as a part of such group.

3. A display device including in combination, a housing formed with a viewing aperture, a miniature group positioned within said housing and in line with said aperture, a condenser lens assembly also located within said housing, reflecting means positioned to one side of said housing and designed to transmit the image of the observer to said condenser lens assembly, a transparent mirror positioned between said miniature group and said viewing aperture and in the focal plane of said condenser lens assembly, whereby the observer views a reflection of himself in miniature as projected by said condenser lens assembly upon said transparent mirror and also views said miniature group through said mirror, thus creating an illusion of the observer in miniature as a part of such group, and means for selectively substituting a further miniature group for said first-named group.

ALBERT M. SHOEMAKER.